United States Patent [19]
Hirono

[11] Patent Number: 5,462,372
[45] Date of Patent: Oct. 31, 1995

[54] TAPE PRINTER AND METHOD

[75] Inventor: Kazuhisa Hirono, Nagoya, Japan

[73] Assignee: Brother Kogyo Kabushiki Kaisha, Nagoya, Japan

[21] Appl. No.: 200,695

[22] Filed: Feb. 23, 1994

[30] Foreign Application Priority Data

Mar. 15, 1993 [JP] Japan .................................. 5-080206
Nov. 12, 1993 [JP] Japan .................................. 5-283044

[51] Int. Cl.⁶ ..................................................... B41J 11/66
[52] U.S. Cl. .......................... 400/615.2; 400/76; 400/83; 400/17
[58] Field of Search ................. 400/615.2, 621, 400/83, 61, 76, 17

[56] References Cited

U.S. PATENT DOCUMENTS 5,223,939  6/1993  Imaizumi ............................... 400/621
5,230,572  7/1993  Hirono ................................. 400/615.2
5,409,317  4/1995  Ueno et al. .......................... 400/615.2

FOREIGN PATENT DOCUMENTS 145478  8/1983  Japan ...................................... 400/65
145480  8/1983  Japan ...................................... 400/65

*Primary Examiner*—Edgar S. Burr
*Assistant Examiner*—Steven S. Kelley
*Attorney, Agent, or Firm*—Oliff & Berridge

[57] ABSTRACT

After a character key provided on a keyboard has been operated to input a text, it is determined using a cut-mark key or the like whether or not a cut mark exists. If it is determined that the cut mark exists, the position for printing the cut mark can be set on a liquid crystal display based on width data extending from an upper end of a tape. Then, the cut mark is printed on the tape together with a text in a text memory, based on the cut mark whose position has been set, thereby producing a tape with characters applied thereon.

20 Claims, 13 Drawing Sheets

Fig.5B

| ITEM | INSTRUCTIONS |
|---|---|
| S1 | IS KEY OPERATED ? |
| S2 | IS CHARACTER KEY OPERATED ? |
| S3 | TMF=1 ? |
| S4 | INPUT CHARACTERS TO TEXT |
| S5 | DISPLAY ERROR |
| S6 | IS CUT-MARK KEY OPERATED ? |
| S7 | EXECUTE CUT-MARK KEY PROCESS |
| S8 | IS CURSOR KEY OPERATED ? |
| S9 | EXECUTE CURSOR KEY PROCESS |
| S10 | IS RETURN KEY OPERATED ? |
| S11 | EXECUTE RETURN KEY PROCESS |
| S12 | IS PRINT KEY OPERATED ? |
| S13 | EXECUTE PRINTING PROCESS |
| S14 | IS CHARACTER-STRING DIRECTION SET KEY OPERATED ? |
| S15 | DISPLAY CHARACTER-STRING DIRECTION DATA BEING SET AT PRESENT |
| S16 | EXECUTE OTHER PROCESSES |

TAPE PRINTER AND METHOD

BACKGROUND OF THE INVENTION

1. Field of the Invention

The present invention relates to a tape printer capable of printing a text such as characters input via a keyboard on an elongated tape to thereby produce the tape with the characters printed thereon and, more particularly, to a tape printer that is capable of printing a cut mark used as a standard for cutting a tape at a desired position on the tape and producing, depending on the purpose, a tape with characters that is formed in a desired width size.

2. Description of the Related Art

A tape printer has heretofore been proposed, wherein a plurality of kinds of tape cassettes with tapes having mutually-different tape widths incorporated therein can be selectively used, and a tape cassette with a tape having a desired tape width incorporated therein is selected from the plurality of kinds of tape cassettes to thereby produce a tape with characters printed thereon.

In this type of tape printer, an operator prepares a tape cassette with a tape incorporated therein, which has a width nearest the width of a tape with characters to be produced and sets the prepared tape cassette to the tape printer so as to print characters or the like on the tape, thereby producing the tape with the characters printed thereon.

However, the widths of the tapes incorporated into the respective tape cassettes are classified into several types (about five) alone. Therefore, the intended tape having the width coincident with the desired width of the tape that the operator attempts to produce, is very few. In contrast with this, the tape having the width coincident with the desired tape width is hardly found under the present condition.

A problem arises where the tape referred to above does not exist in the tapes. That is, characters or the like are first printed on a tape having a width greater than a desired tape width to thereby produce the tape with the characters printed thereon. It is thereafter necessary to cut the produced tape with scissors or the like so as to have a desired tape width. Thus, since the conventional tape printer does not have a function for printing a cut mark used as a standard for cutting the tape, it is difficult to cut the tape in a desired tape width, thus creating difficulties in producing the tape with the characters, which tape has the desired tape width.

SUMMARY OF THE INVENTION

It is therefore an object of the present invention to provide a tape printer capable of printing a cut mark used as a standard for cutting a tape at a desired position on the tape and producing, depending on the purpose, a tape with characters that has a desired tape width size.

In order to achieve the above object, the tape printer according to the present invention includes a text producer for producing a text including document data such as characters, a text memory for storing therein text data about a text produced by the text producer and a printer for printing characters or the like on an elongated tape in accordance with the text data stored in the text memory. The tape printer includes a print mode setting device for setting a cut-mark print mode for printing a cut mark on the tape by the printer, and a print position specifying device for specifying a position where the cut mark is printed on the tape when the cut-mark print mode is set by the print mode setting device. The printer prints the cut mark at the position specified by the print position specifying device when the characters or the like are printed on the tape under the cut-mark print mode.

Incidentally, it is desirable that the print position specifying device specifies the position where the cut mark is printed within the width of the tape along the longitudinal direction of the tape. Alternatively, it is preferable to specify the position where the cut mark extending in the transverse direction of the tape is printed.

In the tape printer according to the present invention, which has the above construction, the text including the document data such as the characters is first created by the text producer. The text data is stored in the text memory. Next, the cut-mark print mode for printing the cut mark on the tape is set by the print mode setting device. Further, the position where the cut mark is printed on the tape is specified by the print position specifying device.

Thereafter, the printer prints the cut mark at the position specified by the print position specifying device together with the characters or the like when the characters or the like are printed on the tape in accordance with the text data stored in the text memory. Thus, the tape with the characters, in which the cut mark has been formed at the position corresponding to the desired tape width desired by the operator, is produced.

According to the present invention, as has been apparent from the above description, a cut mark used as the standard for cutting a tape can be printed at a desired position within the width of the tape. Thus, a tape printer capable of producing a tape having a desired tape width and characters applied thereon depending on the purpose can be provided, thereby making it possible to bring about advantageous effects.

BRIEF DESCRIPTION OF THE DRAWINGS

FIGS. 5A and 5B are a flowchart of a basic control program employed in the tape printer.

DETAILED DESCRIPTION OF PREFERRED EMBODIMENTS

One embodiment of the present invention will hereinafter be described with reference to the accompanying drawings.

Figure 1:
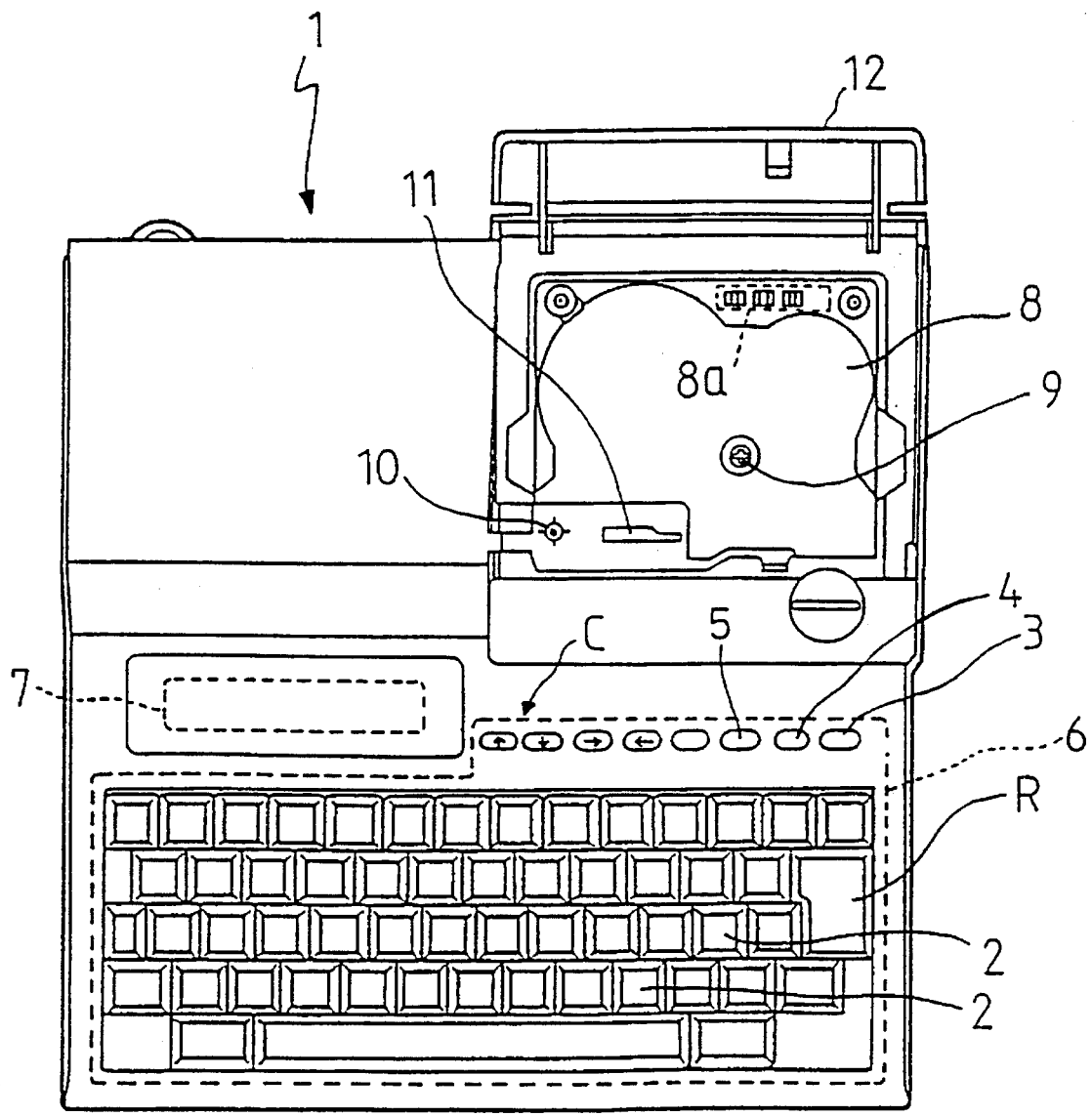
FIG. 1 is a plan view showing a tape printer in which a holding cover of a tape cassette holder is in an open state.

FIG. 1 is a plan view showing a tape printer in which a storage or holding cover of a tape cassette holder has been opened. In FIG. 1, the tape printer 1 comprises a character input key 2 for inputting characters such as letters throughout a plurality of lines and creating a text made up of document data (code data), a print key 3 for issuing text print instructions, a cut-mark key 4 for setting a cut-mark print mode used to print a cut mark, described later, a character-string direction set key 5 for setting the direction of a character string in either a direction parallel to the longitudinal direction of a tape or a direction perpendicular to the tape longitudinal direction, a keyboard 6 provided thereon with a cursor key C for shifting or moving the cursor in upward and downward directions and in left and right directions on a liquid crystal display 7, a return key R for issuing line-feed instructions and instructions for executing various processes and selecting any one of them, etc., the liquid crystal display 7 for displaying thereon characters or the like input via the keyboard 6, and a cassette holder 8 for holding or accommodating a tape cassette 13, described later, therein.

Further, a ribbon take-up shaft 9 rotatably driven by an unillustrated pulse motor, for rotating a ribbon receiving or take-up spool 21 of the tape cassette 13 to thereby take up or wind a thermal ink ribbon 17 thereon, is provided in the cassette holder 8. A tape feed roller shaft 10 rotatably driven by a tape feed motor 40, described later, via a suitable transmission mechanism so as to rotate a tape feed roller 27, described later, is provided ahead of the ribbon take-up shaft 9 as seen in its diagonal direction (on the keyboard 6 side). Moreover, a thermal head 11 for printing characters on a film tape 15, described later, using the thermal ink ribbon 17 is fixed to the front of the cassette holder 8. A tape width detector 8a for detecting the width of a tape (hereinafter called a "fitted tape") that has been held in the tape cassette 13 fitted or mounted in the tape printer 1, from a tape width indicating device (not shown) fitted to the tape cassette 13, is provided behind the cassette holder 8 (on the left side as viewed from FIG. 1).

The cassette holder 8 is opened and closed by a holding cover 12 rotatably pivoted by a rear portion of the tape printer 1. When the cassette holder 8 is in an opened state, the replacement of the tape cassette 13 with another or the like is performed.

Figure 2:
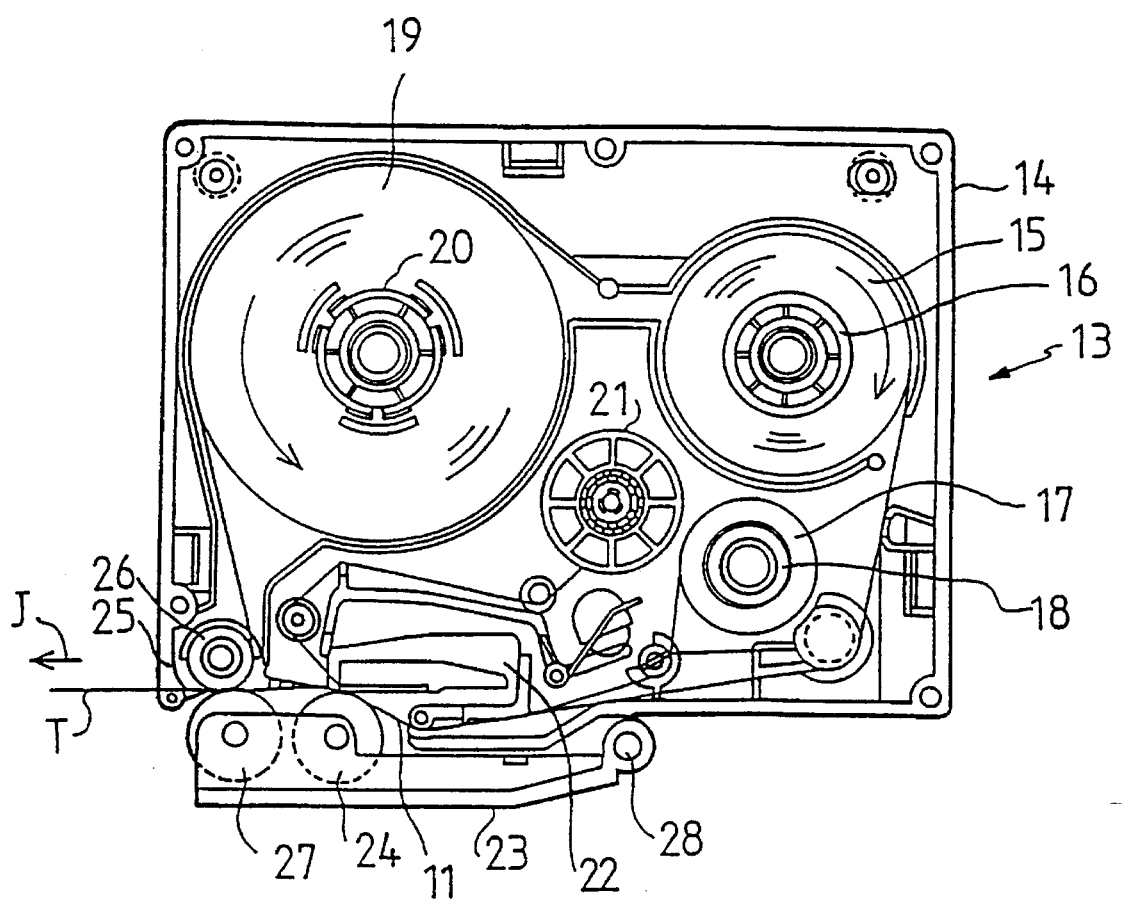
FIG. 2 is a plan view showing the manner in which a tape cassette is being held in the cassette holder.

The structure of the tape cassette 13 will now be described below with reference to FIG. 2. FIG. 2 is a plan view showing the manner in which the tape cassette 13 is held in the cassette holder 8 (showing the tape cassette 13 from which an upper case has been removed).

Referring to FIG. 2, a tape spool 16 with a transparent film tape 15 wound thereon, a ribbon spool 18 with the thermal ink ribbon 17 wound thereon, and an adhesive tape spool 20 in which an adhesive double coated tape 19 with released paper applied thereon is wound thereon with the released paper directed to the outside, are respectively disposed within a lower case 14 of the tape cassette 13. The respective spools 16, 18 and 20 are supported so as to be rotatable in cooperation with a support portion attached to a lower surface of the unillustrated upper case.

Similarly, the ribbon take-up spool 21 is rotatably supported among the spools 16, 18 and 20. The ribbon take-up spool 21 is maintained in engagement with the ribbon take-up shaft 9 so that the thermal ink ribbon 17 used for printing is wound by the drive action of the ribbon take-up shaft 9.

Further, the thermal head 11 is disposed within a concave portion 22 defined in the lower case 14. A platen roller 24 rotatably supported by a roller holder 23 is provided in an opposing relationship to the thermal head 11 at a position where the platen roller 24 can be pressed against the thermal head 11. The thermal head 11 has a number of heating elements (the thermal head 11 of the tape printer 1 in the present embodiment has 128 heating elements) and prints characters or the like on the film tape 15 using the thermal ink ribbon 17.

A tape pressure roller 26 is rotatably supported in the vicinity of a tape ejecting device 25 (disposed on the left and lower side in FIGS. 1 and 2). The tape feed roller 27 rotatably supported by the roller holder 23 is provided in an opposing relationship to the tape pressure roller 26 at a position where it can be pressed against the tape pressure roller 26.

The roller holder 23 is provided in front (on the lower side in FIGS. 1 and 2) of the tape cassette 13 and held in the cassette holder 8 so as to be turnably pivoted by a support shaft 28. The roller holder 23 can be pivoted between print and release positions by an unillustrated manual switching mechanism (Figs. I and 2 both show the manner in which the roller holder 23 has been changed to the print position).

The platen roller 24 and the tape feed roller 27 are respectively disposed within the roller holder 23 so that they are rotatable and pressed against the thermal head 11 and the pressure roller 26 when the roller holder 23 is changed to the print position. Incidentally, the tape feed roller 27 is rotatably driven by the tape feed roller shaft 10, and at the same time the pressure roller 26 is rotatably driven by an unillustrated gear mechanism in association with the tape feed roller 27.

Further, the pressure roller 26 and the tape feed roller 27 are driven in cooperation with each other to press an adhesive-applied surface of the adhesive double coated tape 19 against the film tape 15 on which characters or the like have been printed by the thermal head 11 using the thermal ink ribbon 17, thereby producing a tape T in the last stage and feeding the tape T in a direction indicated by arrow J. Incidentally, the produced tape T is cut by a cutter (not shown) disposed on the left side of the tape cassette 13. The construction of such a cutter is known per se and its description will therefore be omitted. The tape width indicating device (not shown) for specifying or indicating the width of the film tape 15, which has been held in the cassette tape 13, is provided on the reverse side of the tape cassette 13.

Figure 3:
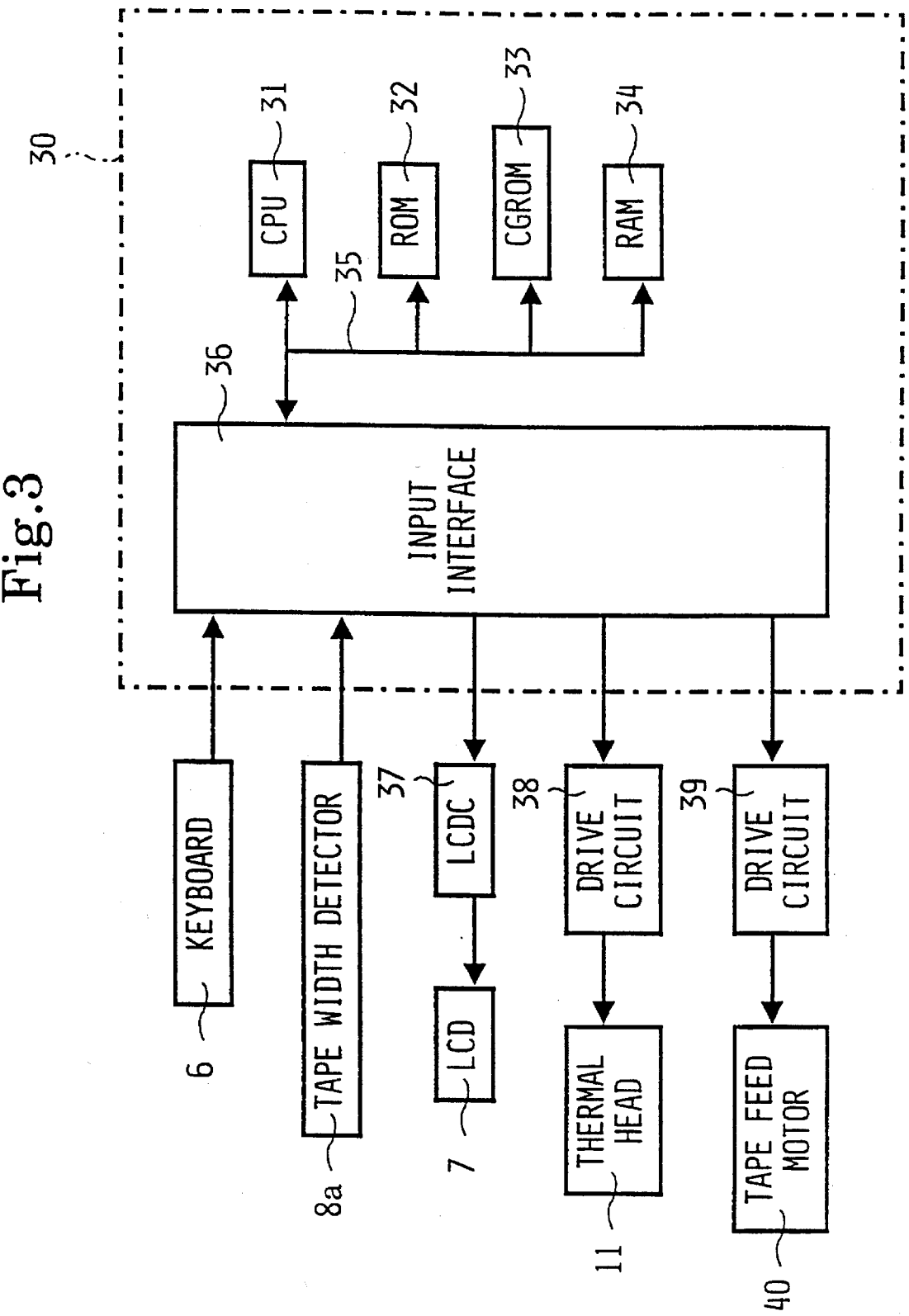
FIG. 3 is a control block diagram showing the tape printer.

A control system of the tape printer I constructed as described above will now be described with reference to FIG. 3. FIG. 3 is a control block diagram showing the tape printer 1, which is constructed with a control device 30 taken as a central part. The control device 30 comprises a CPU 31, a ROM 32, a CGROM 33 and a RAM 34, which are electrically connected to one another via a bus 35 and are also electrically connected to an input/output interface 36.

The ROM 32 is used to store therein various programs such as a basic control program, a cut-mark key processing program, a cursor-key processing program, a return-key processing program, a print processing program and other various programs required to control the tape printer 1, all of which will be described later. The CPU 31 performs various operations or computations based on the various programs stored in the ROM 32. Contour line data (outline data) for prescribing or specifying outlines of a number of characters such as letters are classified for a plurality of styles (Gothic type, Ming type, etc.) and stored in the ROM 32 so as to correspond to code data. Dot pattern data are developed in an image buffer 42 to be described later based on the above outline data. Further, table data produced in such a manner that data about the width of the fitted tape and positions on the thermal head 11, which correspond to the upper and lower ends of the fitted tape, correspond to various tape widths, are stored in the ROM 32.

Further, dot pattern data corresponding to respective character input via the keyboard 6 are stored in the CGROM 33. Desired dot pattern data is read from the CGROM 33 and dot patterns are displayed on the liquid crystal display 7 based on the read dot pattern data.

Figure 4:
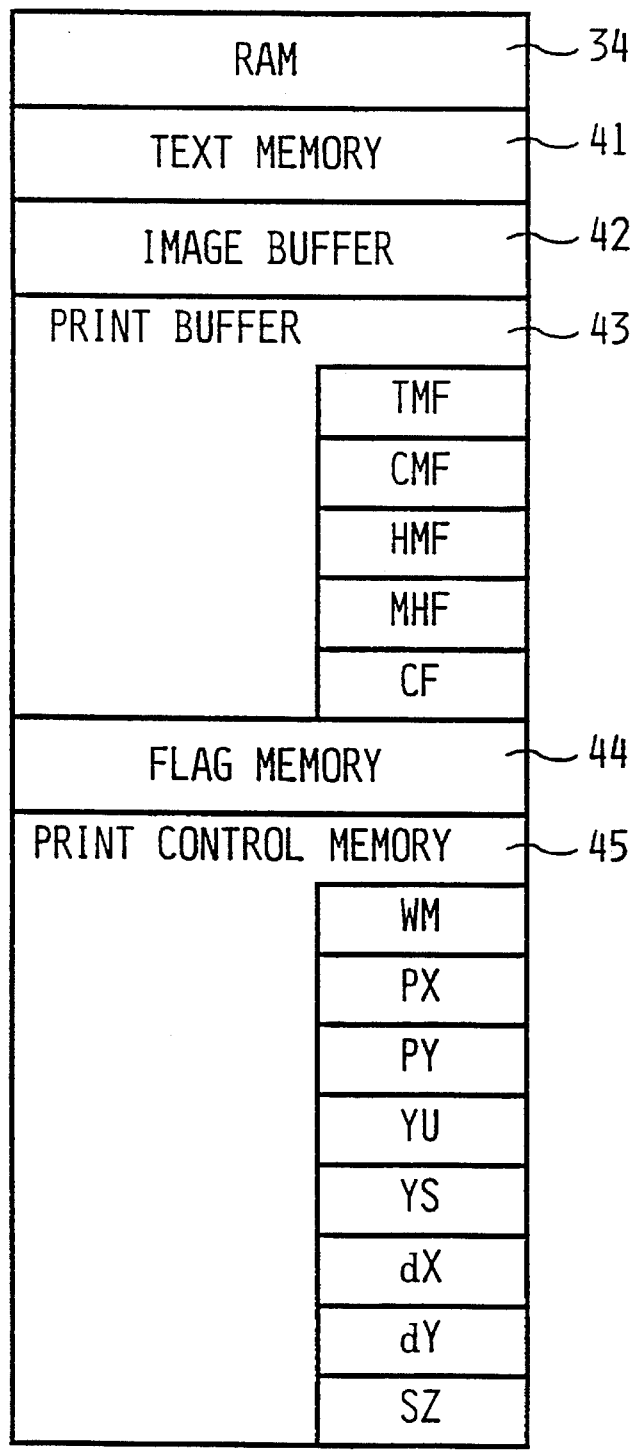
FIG. 4 is a schematic view showing the contents of a RAM.

Moreover, the RAM 34 is used to temporarily store various results computed by the CPU 31 and is provided with various memories as shown in FIG. 4.

Referring to FIG. 4, a text memory 41 is used to store code data corresponding to characters input via the keyboard 6 therein as document data (text). An image buffer 42 is used to develop the outline data read from the ROM 32 so as to correspond to the document data of the text stored in the text memory 41 and to store the same therein.

In addition, the dot pattern data stored in the image buffer 42 is transferred to a print buffer 43 upon printing and stored therein. The thermal head 11 performs dot printing in accordance with the dot pattern data stored in the print buffer 43. A flag memory 44 has various flags such as input mode flags including a text mode flag TMF set to "1" upon a text input mode, a cut-mark mode flag CMF set to "1" upon a mode indicative of either presence or absence of a cut mark, i.e., whether or not the cut mark exists, a width mode flag HMF set to "1" upon a mode indicative of a printing position of a cut mark as a width extending from an upper end of a tape or a print start position, a character-string direction mode flag MHF set to 1 upon a mode for setting the direction of a character string, etc., and a cut mark flag CF set to "1" when a cut-mark print mode is set by depressing the cut-mark key 4.

A print control memory 45 has various memory regions and is provided with various memories such as a width data memory for storing therein data H about the width extending from the tape upper end and corresponding to the printing position of the cut mark or the print start position, a reference-position coordinate memory PX for storing therein a coordinate in the longitudinal direction of the film tape 15, of a reference position at which the dot pattern data such as the characters is arranged in the print buffer 43, a reference-position coordinate memory PY for storing therein a coordinate in the transverse direction of the film tape 15, of the reference position, a tape upper-end position memory YU for storing therein a position on the thermal head 11, which corresponds to the upper end of the fitted tape, a tape lower-end position memory YS for storing therein a position on the thermal head 11, which corresponds to the lower end of the film tape 15 loaded in the tape printer 1, an arrangement position memory dX for storing therein a lower-end position in the longitudinal direction of the film tape 15, of each dot pattern data when the dot pattern data such as the characters is arranged in the print buffer 43, an arrangement position memory dY for storing therein a position on the thermal head 11, which corresponds to a lower-end position in the transverse direction of the film tape 15, of each dot pattern data when the dot pattern data such as the characters is arranged in the print buffer 43, and a character size memory SZ for storing the height of each character and the width of each character therein, etc.

Further, the print control memory 45 is provided with a character-string direction data memory for storing character-string direction data M of a type wherein data "0" is set at 0°, data "1" is set at 90°, data "2" is set at 180° and data "3" is set at 270° when a character string is rotated at 0°, 90°, 180° and 270° counterclockwise with respect to the longitudinal direction of the tape upon the character-string direction setting mode.

Referring back to FIG. 3, the control block diagram will be further described below. The keyboard 6 and the tape width detector 8a for detecting the width of the fitted tape are electrically connected to the control device 30 via the input/output interface 36, whereas the liquid crystal display 7 and a display controller 37 are electrically connected to the control device 30 via the input/output interface 36. When the characters or the like are input via the character input key 2 on the keyboard 6, document data about the characters or the like are successively stored in the text memory 41. Further, dot patterns corresponding to the characters or the like input via the keyboard 6 are displayed on the liquid crystal display 7 based on a dot pattern generation control program and a display control program.

Further, the thermal head 11 is driven by a drive circuit 38 so as to print the dot pattern data transferred to the print buffer 43 from the image buffer 42. In synchronism with its printing operation, the tape feed motor 40 controls the feeding of the tape T via a drive circuit 39.

Figure 5A:
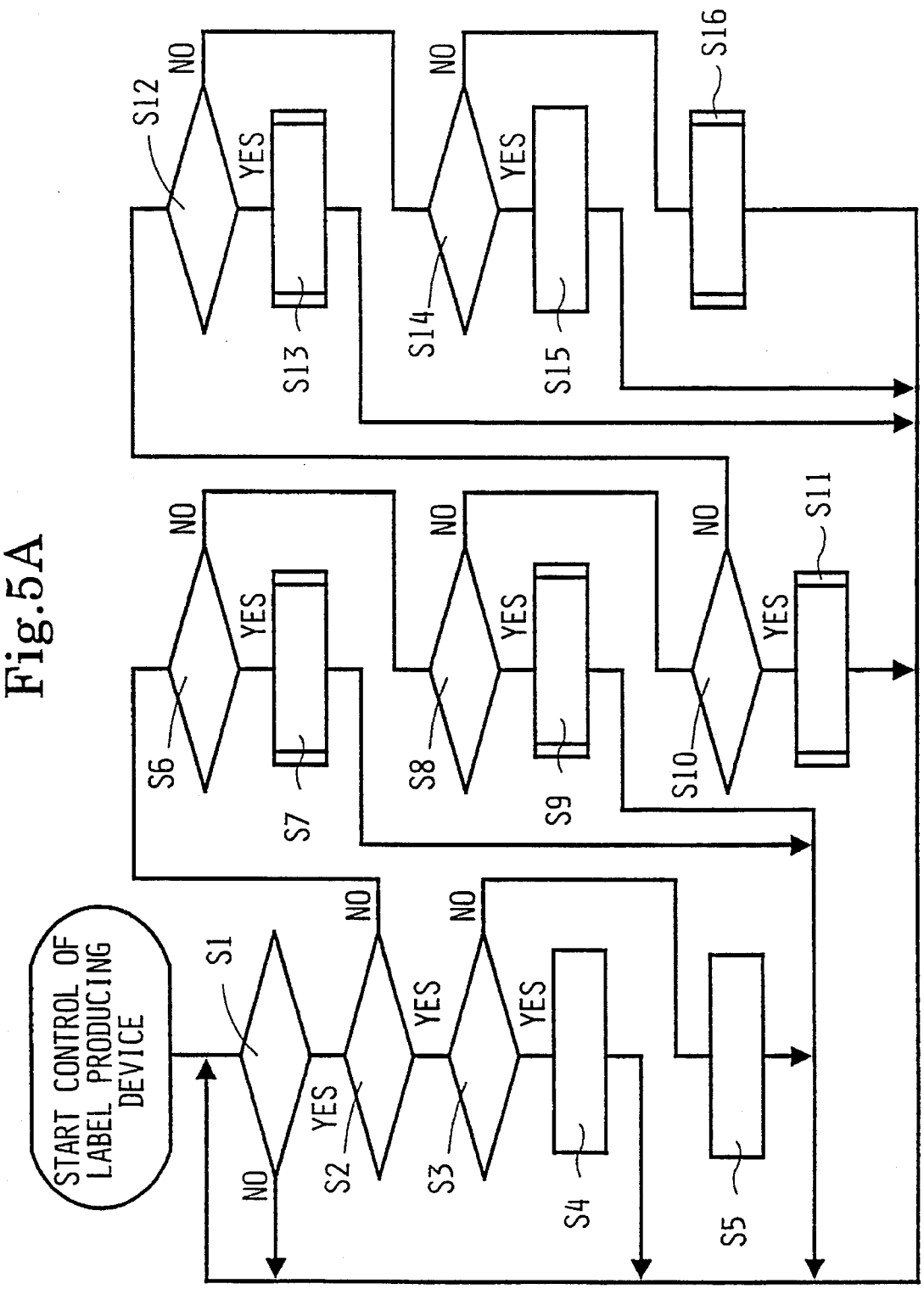

Operation of the tape printer constructed as described above will now be described with reference to FIGS. 5A through 11. FIGS. 5A and B are a flowchart of the basic control program employed in the tape printer. When a power source is turned on via a power-source key, the basic control program is requested to initiate execution after a predetermined initialization process has been carried out.

Here, the text mode flag TMF is set to "1" when the initialization process is made. Further, the cut-mark mode flag CMF, the width mode flag HMF and a character-string direction setting mode flag MMF are respectively reset to "0", so that the tape printer 1 is set to the text input mode. Then, the cut mark flag CF is reset to "0" and set to a state "free of" or a state of "absence" of a cut mark. Thereafter, the character-string direction data M is set to "0" so that the direction of the character string is set to the direction extending along the longitudinal direction of the tape. Incidentally, the maximum value MMax of the character-string direction data M is set to "3" and the minimum value MMin thereof is set to "0".

Further, an initial value is set as the width data H stored in the width data memory. In the present embodiment, "12" (which shows a value corresponding to 12 mm) is set as the initial value of the width data H. The maximum value HMax of the width data H is set 24 (which shows a value corresponding to 24 mm), whereas the minimum value HMin is set to 6 (which shows a value corresponding to 6 mm). The width data H can be set for each 1 mm as will described later. Incidentally, the maximum and minimum values are not necessarily limited to the above values and are of values that can be suitably changed.

After completion of the above initialization process, it is determined in Step (hereinafter abbreviated as "S") 1 whether or not any one of the keys on the keyboard 6 has been depressed or operated. If it is determined in S1 that any key has not been operated (i.e., if the answer is negative in S1), a routine procedure is placed in a waiting state until any one of the keys is operated. On the other hand, if it is determined in S1 that any one of the keys has been operated (i.e., if the answer is affirmative in S1), it is then judged whether or not the character input key 2 has been operated (S2).

If it is determined in S2 that the character input key 2 has been operated (i.e., if the answer is affirmative in S2), it is then determined whether or not the text mode flag TMF has been set to "1" (S3). If it is determined in S3 that the text mode flag TMF has been set to "1" and the text input mode has been selected (i.e., if the answer is affirmative in S3), a text such as characters input via the character input key 2 is stored in the text memory 41 (S4) and the routine procedure is thereafter returned to S1. On the other hand, if it is determined in S3 that "1" has not been set to the text mode flag TMF (i.e., if the answer is negative in S3), the input given via the character input key 2 is made invalid and an error is displayed on the liquid crystal display 7 (S5). Thereafter, the routine procedure is returned to S1. By repeatedly executing the processes in S2 through S4, texts are successively created, and the created texts are stored in the text memory 41.

If it is determined in S2 that the character input key 2 has not been operated (i.e., if the answer is negative in S2), it is determined in S6 whether or not the cut-mark key 4 has been operated. If it is determined in S6 that the cut-mark key 4 has not been operated (i.e., if the answer is negative in S6), the routine procedure proceeds to S8. On the other hand, if it is determined in S6 that the cut-mark key 4 has been operated (i.e., if the answer is affirmative in S6), a cut-mark key process shown in FIG. 6 is executed (S7).

Figure 6:
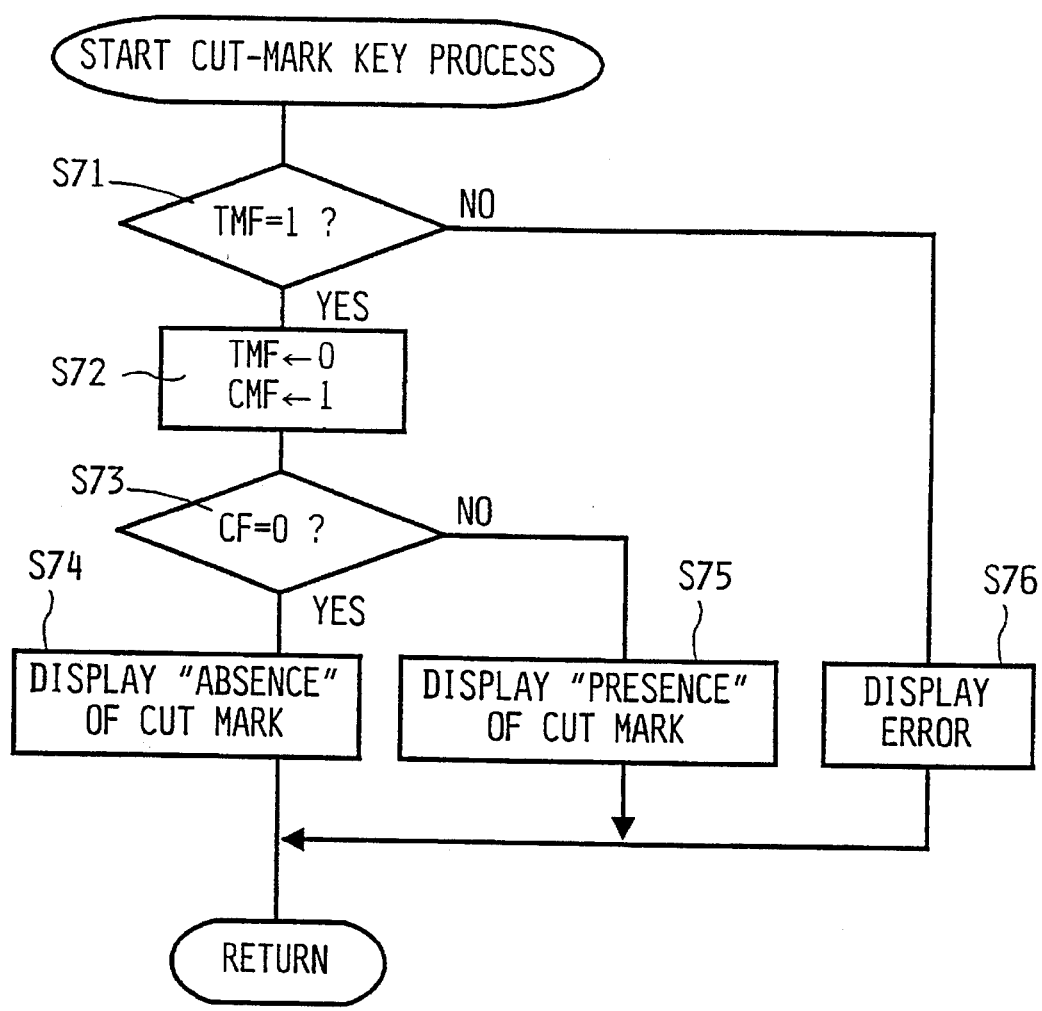
FIG. 6 is a flowchart of a cut-mark key processing program employed in the tape printer.

FIG. 6 is a flowchart of the cut-mark key processing program. When the cut-mark key process is initiated, it is determined whether or not the text mode flag TMF has first been set to "1" and the text input mode has then been selected (S71). If it is determined in S71 that the text input mode has been selected (i.e., if the answer is affirmative in S71), the text mode flag TMF is reset to "0" and the cut-mark mode flag CMF is set to "1". Thus, a mode indicative of whether or not a cut mark exists is selected (S72). It is thereafter determined whether or not the cut mark flag CF has been reset to "0" (S73). If it is determined in S73 that the cut mark flag CF has been reset to "0" (i.e., if the answer is affirmative in S73), a comment indicative of "absence" of the cut mark is displayed on the liquid crystal display 7 (S74). Thereafter, the cut-mark key process is completed and the routine procedure is returned to S1.

On the other hand, if it is determined in S73 that the cut mark flag CF has not been reset to "0" (i.e., if the answer is negative in S73), it is then set to "1" and hence a comment indicative of "presence" of the cut mark is displayed on the liquid crystal display 7 (S75). Thereafter, the cut-mark key process is finished and the routine procedure is returned to S1. If it is determined in S71 that the text mode flag TMF has not been set to the text input mode (i.e., if the answer is negative in S71), an error is displayed on the liquid crystal display 7 (S76). Thereafter, the cut-mark key process is completed and the routine procedure is returned to S1.

The text input mode is shifted to the cut-mark mode for displaying either the presence or absence of the cut mark by executing the processes in S6 and S7 (S71 through S76).

It is next determined in S8 whether the cursor key C has been operated. If it is determined in S8 that the cursor key C has been operated (i.e., if the answer is affirmative in S8), the cursor key process shown in FIG. 7 is executed (S9).

Figure 7:
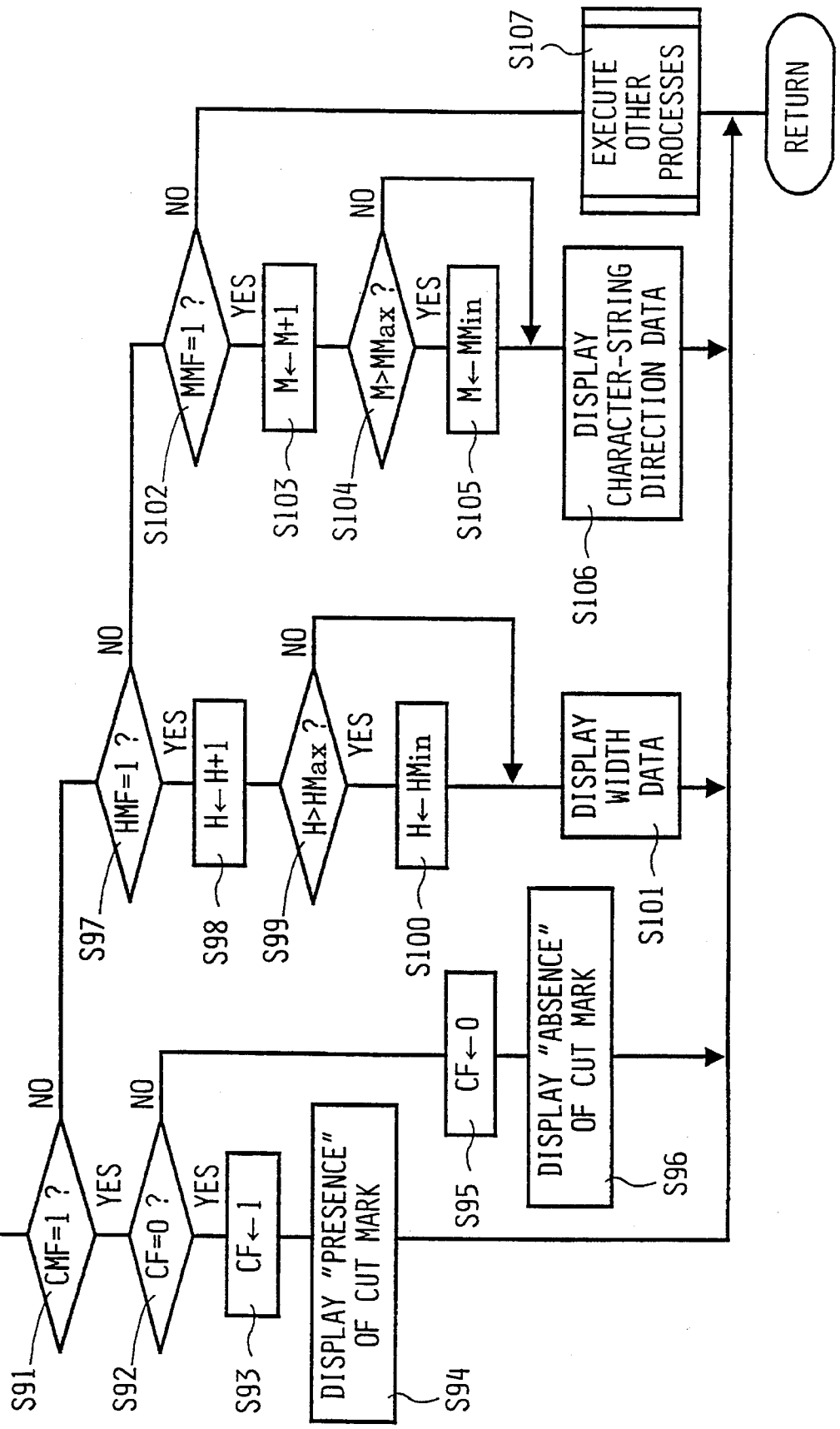
FIG. 7 is a flowchart of a cursor key processing program employed in the tape printer.

FIG. 7 is a flowchart of the cursor key processing program. When the cursor key process is started, it is first determined whether or not the cut-mark mode flag CMF has been set to "1" (S91). If it is determined in S91 that the cut-mark mode flag CMF has not been set to "1" (i.e., if the answer is negative in S91), the routine procedure proceeds to S97. On the other hand, if it is determined in S91 that the cut-mark mode flag CMF has been set to "1" (i.e., if the answer is affirmative in S91), it is then determined whether or not the cut mark flag CF has been reset to "0" (S92).

If it is determined in S92 that the cut mark flag CF has been reset to "0" (i.e., if the answer is affirmative in S92), "1" is set to the cut mark flag CF (S93), and a comment indicative of "presence" of the cut mark is displayed on the liquid crystal display 7 (S94). Thereafter, the cursor key process is completed, and the routine procedure is returned to S1. On the other hand, if it is determined in S92 that the cut mark flag CF has not been reset to "0" (i.e., if the answer is negative in S92), the cut mark flag CF is reset to "0" (S95), and a comment indicative of "absence" of the cut mark is displayed on the liquid crystal display 7 (S96). Thereafter, the cursor key process is finished, and the routine procedure is returned to S1. By executing the processes in S13 or S91 through S96, the displays on the liquid crystal display 7 of the presence or absence of the cut mark are alternately changed.

If it is next determined in S91 that the cut-mark mode flag CMF has not been set to "1" (i.e., if the answer is negative in S91), the routine procedure proceeds to S97, where it is determined whether or not the width mode flag HMF has been set to "1". If it is determined in S97 that the width mode flag HMF has been set to "1" (i.e., if the answer is affirmative in S97), the width data H stored in the width data memory is incremented by 1 (S98). It is then determined whether or not the width data H exceeds the maximum value HMax of the width data (S99). If it is determined in S99 that the width data H has exceeded the maximum value HMax (i.e., if the answer is affirmative in S99), the width data H is set to the minimum value HMin (S100). Thereafter, the routine procedure proceeds to S101. On the other hand, if it is determined in S99 that the width data H has not exceeded the maximum value HMax (i.e., if the answer is negative in S99), the routine procedure proceeds to S101.

In S101, the width data H is displayed on the liquid crystal display 7 based on the processes in S97 through S100 referred to above. Thereafter, the cursor key process is completed, and the routine procedure is returned to S1. Thus, by executing the processes in S97 through S101 referred to above, the width H (extending from the upper end of the tape or the print start position) corresponding to the position for printing the cut mark can be displayed on the liquid crystal display 7, while being changed between the maximum value HMax and the minimum value HMin in turn.

If it is determined in S97 that "1" has not been set to the width mode flag HMF (i.e., if the answer is negative in S97), the routine procedure proceeds to S102, where it is determined whether or not the character-string direction mode flag MMF has been set to "1". If it is judged in S102 that the character-string direction mode flag MMF has been set to "1" (i.e., if the answer is affirmative in S102), the character-string direction data M stored in the character-string direction data memory is incremented by 1 (S103). It is then determined whether or not the character-string direction data M has exceeded the maximum value MMax (S104) of the character-string direction data M. If it is determined in S104 that the character-string direction data M has exceeded the maximum value MMax (i.e., if the answer is affirmative in S104), the character-string direction data M is set to the minimum value MMin (S105), after which the routine procedure proceeds to S106. On the other hand, if it is determined in S104 that the character-string direction data M has not exceeded the maximum value MMax (i.e., if the answer is negative in S104), the routine procedure immediately proceeds to S106.

In S106, either the character-string direction data M or angles 0° through 270° each corresponding to the character-string direction data M are displayed on the liquid crystal display 7 based on the processes in S102 through S105 referred to above. Thereafter, the cursor key process is completed and the routine procedure is shifted to S1. Thus, by carrying out the processes in S102 through S106, the character-string direction can be displayed on the liquid crystal display 7, while being changed in turn between the minimum value MMin and the maximum value MMax or between 0°, 90°, 180° and 270°.

If it is determined in S102 that "1" has not been set to the character-string direction mode flag MMF (i.e., if the answer is negative in S102), other processes other than the above processes are executed (S107). Thereafter, the cursor key process is completed and the routine procedure is returned to S1.

If it is then determined in S8 that the operated key is not the cursor key C (i.e., if the answer is negative in S8), the routine procedure proceeds to S10, where it is determined whether or not the return key R for executing various selecting processes has been operated. If it is judged in S10 that the return key R has been operated (i.e., if the answer is affirmative in S10), a return key process shown in FIG. 8 is executed (S11).

Figure 8:
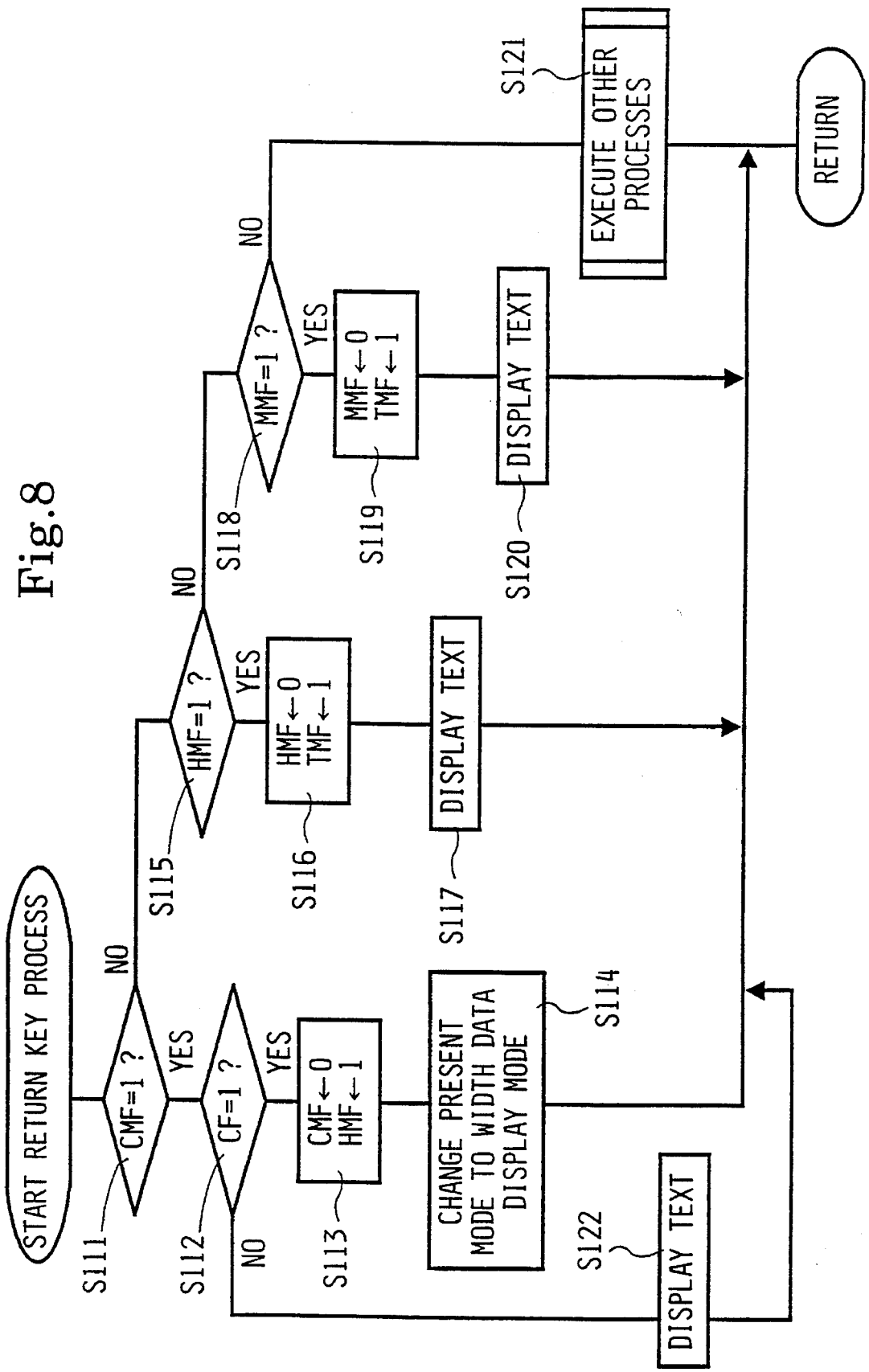
FIG. 8 is a flowchart of a return-key processing program employed in the tape printer.

FIG. 8 is a flowchart of the return-key processing program. When the return key process is initiated, it is first determined whether or not the cut-mark mode flag CMF has been set to "1" (S111). If it is determined in S111 that "1" has been set to the cut-mark mode flag CMF (i.e., if the answer is negative in S111), the routine procedure proceeds to S115. On the other hand, if it is determined in S111 that "1" has been set to the cut-mark mode flag CMF (i.e., if the answer is affirmative in S111), it is then determined whether or not "1" has been set to the cut mark flag CF (S112). If it is judged in S112 that "1" has been set to the cut mark flag CF (i.e., if the answer is affirmative in S112), the cut-mark mode flag CMF is reset to "0" and "1" is set to the width mode flag HMF (S113). Further, a width data display mode for displaying the width data H is selected (S114). Thereafter, the return key process is finished, and the routine procedure is returned to S1.

If it is determined in S112 that the cut mark flag CF has not been set to "1" (i.e., if the answer is negative in S112), the text stored in the text memory 41 is displayed on the liquid crystal display 7 (S122). Thereafter, the return key process is completed, and the routine procedure is returned to S1. Thus, the mode indicative of the presence or absence of the cut mark is changed to the width data display mode by executing the respective processes in S10 or S111 through S114 used for the return key process.

It is determined in S115 whether or not the width mode flag HMF has been set to "1". If it is determined in S115 that the width mode flag HMF has been set to "1" (i.e., if the answer is affirmative in S115), the width mode flag HMF is reset to "0", and the text mode flag TMF is set to "1" so as to provide or select the text input mode (S116). Further, the text stored in the text memory 41 is displayed on the liquid crystal display 7 (S117). Thereafter, the return key process is completed, and the routine procedure is returned to S1.

On the other hand, if it is determined in S115 that the width mode flag HMF has not been set to "1" (i.e., the answer is negative in S115), it is determined in S118 whether the character-string direction setting mode flag MMF has been set to "1" (i.e., if the answer is affirmative in S118). If so, the character-string direction setting mode flag MMF is reset to "0", and the text mode flag TMF is set to "1" so that the text input mode is selected (S119). Further, the text stored in the text memory 41 is displayed on the liquid crystal display 7 (S120). Thereafter, the return key process is finished, and the routine procedure is returned to S1.

On the other hand, if it is determined in S118 that the character-string direction setting mode flag MMF has not been set to "1" (i.e., if the answer is negative in S118), other processes are executed (S121). Thereafter, the return key process is completed, and the routine procedure is returned to S1. By executing the processes in S118 through S120 referred to above, the character-string direction setting mode for setting the direction of the character string is changed to the text input mode.

Further, if it is determined in S10 that the return key R has not been operated (i.e., if the answer is negative in S10), the routine procedure proceeds to S12, where it is then determined whether or not the operated key is of the print key 3. If it is judged in S12 that the print key 3 has been operated (i.e., if the answer is affirmative in S12), print control to be described later is performed (S13). Thereafter, the routine procedure is returned to S1. On the other hand, if it is determined in S12 that the print key 3 has not been operated (i.e., if the answer is negative in S12), the routine procedure proceeds to S14.

It is determined in S14 whether or not the character-string direction set key 5 has been operated. If it is judged in S14 that the character-string direction set key 5 has been operated (i.e., if the answer is affirmative in S14), the character-string direction data M or any one of angles 0°, 90°, 180° and 270° each corresponding to the character-string direction data M is displayed on the liquid crystal display 7 (S15), and the routine procedure is returned to S1. On the other hand, if it is determined in S14 that the character-string direction set key has not been operated (i.e., if the answer is negative in S14), other processes are carried out (S16), and the routine procedure is returned to S1.

Figure 9:
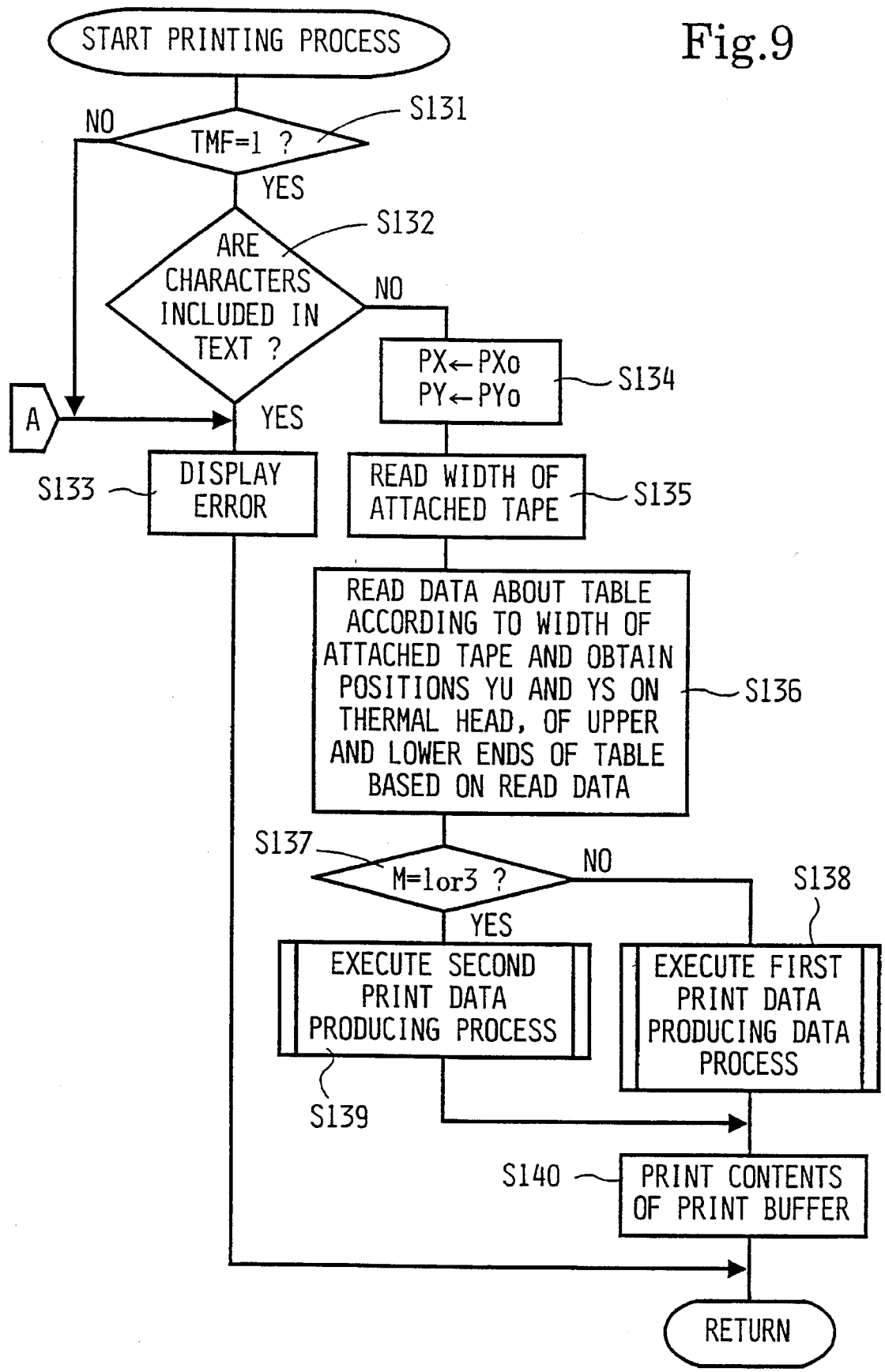
FIG. 9 is a flowchart of a print control program employed in the tape printer.
Figure 10:
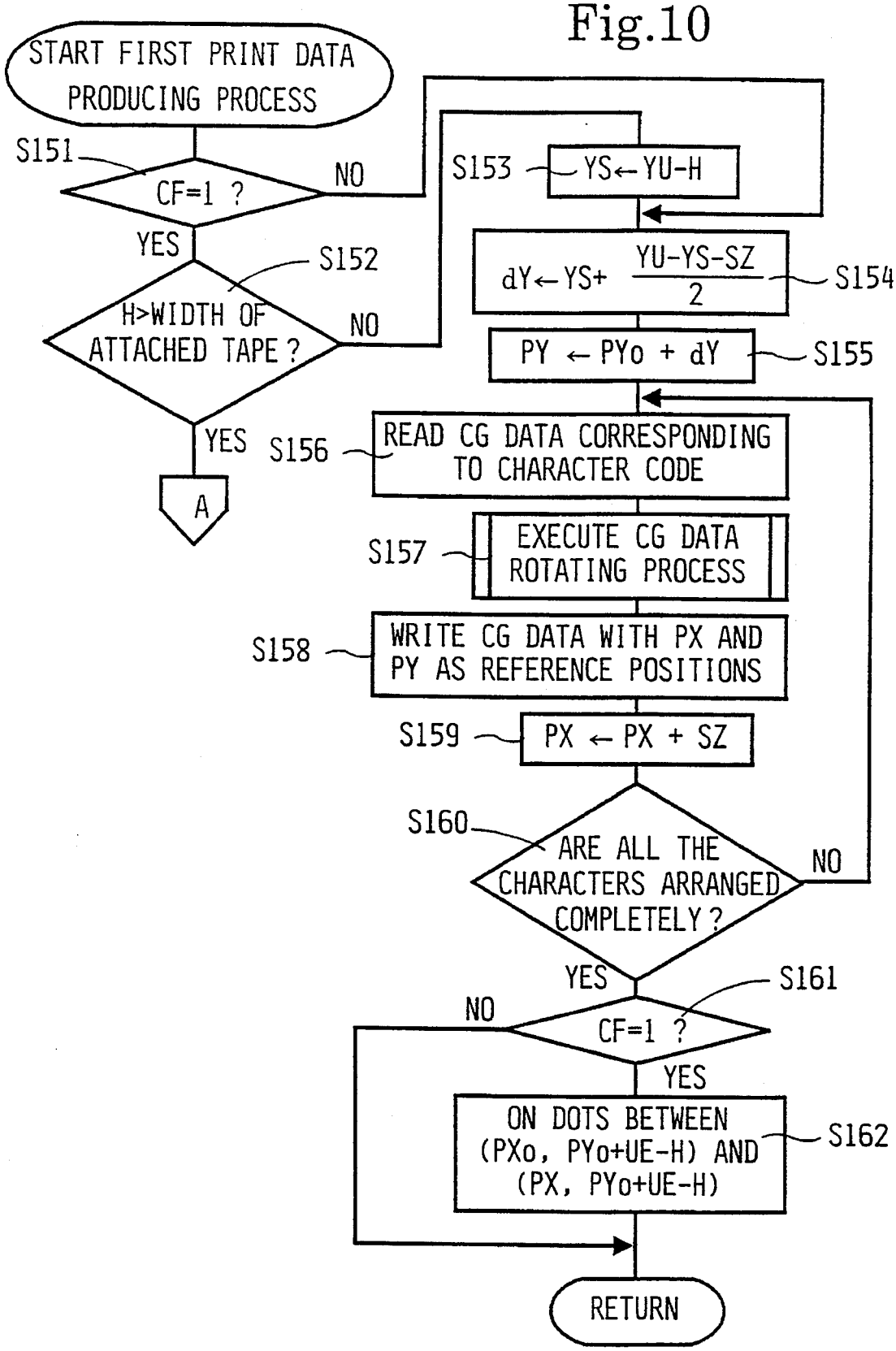
FIG. 10 is a flowchart of a first print data producing and processing program employed in the tape printer.
Figure 11:
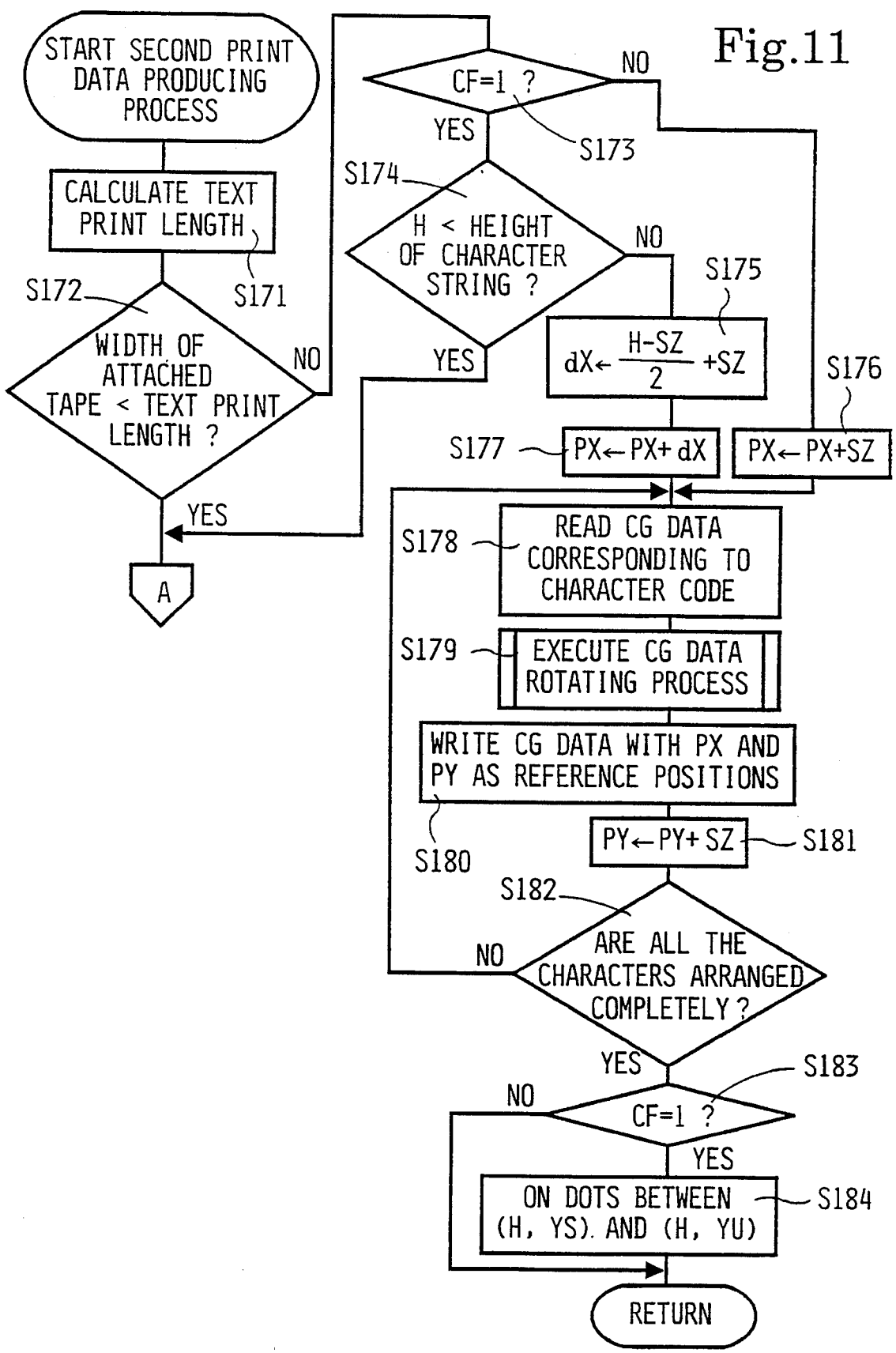
FIG. 11 is a flowchart of a second print data producing and processing program employed in the tape printer.

The printing process executed in S13 will next be described with reference to FIGS. 9 through 11. FIGS. 9 through 11 are respectively flowcharts of the print processing program. When the print key 3 is depressed, the print processing program is executed.

When the print key 3 is depressed, it is first determined in S131 whether or not "1" has been set to the text mode flag TMF. If it is determined in S131 that "1" has not been set to the text mode flag TMF (i.e., if the answer is negative in S131), an input given via the print key 3 is invalidated and an error is displayed (S133). Thereafter, the printing process is completed, and the routine procedure is returned to S1.

On the other hand, if it is determined in S131 that "1" has been set to the text mode flag TMF (i.e., if the answer is affirmative in S131), it is then determined whether or not a text exists in the text memory 41 (S132). If it is judged in S132 that the text does not exist in the text memory 41 (i.e., if the answer is affirmative in S132), the input given via the print key 3 is invalidated, and the error is displayed (S133). Thereafter, the print control is finished, and the routine procedure is returned to S1. On the other hand, if it is determined in S132 that the text exists in the text memory 41 (i.e., if the answer is negative in S132), data about coordinates (PXo, PYo) of the origin of the print buffer 43, which has been stored in the ROM 32, are respectively set to the reference-position coordinate memories PX and PY (S134).

Next, the width of the fitted tape, which is indicated by the tape width indicating device of the tape cassette 13 mounted in the tape printer 1, is detected by the tape width detector 8a. Data about the detected width is temporarily stored in the RAM 34 (S135). Further, the table data stored in the RAM 32 is read according to the tape width. As a result, data about the positions on the thermal head 11, which correspond to the upper and lower ends of the film tape 15, are respectively obtained and stored in the tape upper-end position memory YU and the tape lower-end position memory YS (a printable region on the fitted tape, which extends in the transverse direction of the tape, exists between the position data stored in the tape lower-end position memory YS and the tape upper-end position memory YU (S136).

It is then determined whether or not the character-string direction data M is of either "1" or "3" (S137). If the direction of the character string is set at either 0° or 180° in the character-string direction setting mode, that is, if the character-string direction is set to the longitudinal direction of the tape, the character-string direction data is set to either "0" or "2" (i.e., it is determined that the answer is negative in S137). Therefore, a first print data generating or producing process shown in FIG. 10 is executed (S138).

FIG. 10 is a flowchart of a first print data producing and processing program. When the first print data producing and processing program is initiated, it is first determined whether or not "1" has been set to the cut mark flag CF (S151). If it is determined in S151 that the "1" has not been set to the cut mark flag CF (i.e., if the answer is negative in S151), the routine procedure proceeds to S154 to be described later.

On the other hand, if it is judged in S151 that "1" has been set to the cut mark flag CF (i.e., if the answer is affirmative in S151), it is then determined whether or not the width data H stored in the width data memory is greater than the width of the fitted tape, which has been stored in the RAM 34 (S152). If it is determined in S152 that the width data H is larger than the tape width (i.e., if the answer is affirmative in S152), the cut mark cannot be printed. Therefore, the routine procedure is returned to S133 for the printing process shown in FIG. 9, where an error display is made. Thereafter, the printing process is completed, and the routine procedure is returned to S1. On the other hand, if it is judged in S152 that the width data H is not greater than the tape width (i.e., if the answer is negative in S152), a value obtained by subtracting the width data H from the contents stored in the tape upper-end position memory YU is stored in the tape lower-end position memory YS (S153), and the routine procedure proceeds to S154.

The process in S153 is executed to change the lower end of the printable position in the tape transverse direction from the lower end of the fitted tape to the cut-mark position, thereby setting the printable region to extend in the tape transverse direction between the cut mark and the upper end of the fitted tape.

Next, the height of the printable region extending in the transverse direction of the fitted tape is determined by subtracting the contents stored in the tape lower-end position memory YS from the contents stored in the tape upper-end position memory YU. Further, a value about the height of a character in the contents stored in the character size memory SZ is subtracted from the height of the above printable region. Thereafter, the result obtained by adding the contents stored in the tape lower-end position memory YS to a value obtained by dividing the result of subtraction by 2, is stored in the arrangement position memory dY (S155). The contents stored in the arrangement position memory dY show a value representing to which position on the thermal head 11 the lower end of dot pattern data corresponds when the dot pattern data such as characters is arranged or disposed in the center of the printable region extending in the tape transverse direction.

The result obtained by adding the contents stored in the arrangement position memory dY to a value of the y-coordinates on the print buffer 43, which is stored in the reference-position coordinate memory PY, is stored in the reference-position coordinate memory PY again (S155). Then, the dot pattern data such as the characters is arranged in the print buffer 43 with the contents stored in the reference-position coordinate memory PX and the reference-position coordinate memory PY as the reference positions. As a result, the dot pattern data is centrally arranged between the upper end of the fitted tape and the cut-mark position when "1" has been set to the cut mark flag CF, whereas the dot pattern data is centrally arranged between the upper end of the tape and the lower end thereof when "1" has not been set to the cut mark flag CF.

Next, outline data is read from the ROM 32 according to a character code. Further, the dot pattern data is developed on the image buffer 42 based on the outline data (S156). Thereafter, a CG data rotating process for rotating the developed dot pattern based on the value of the character-string direction data M is executed (S157). If the character-string direction data M is "0" upon execution of this process, the character-string direction is 0° with respect to the longitudinal direction of the tape. Therefore, the developed dot pattern is not rotated. When, on the other hand, the character-string direction data M is "2", the character-string direction is 180° with respect to the longitudinal direction of the tape. Thereafter, the data about the dot pattern subjected to the rotating process is placed in the reference position at which each of the contents stored in the reference-position coordinate memory PX and the reference-position coordinate memory PY is shown (S158).

Further, the value about the width of the character in the contents stored in the character size memory SZ is added to the contents stored in the reference-position coordinate memory Px, and the result of addition is stored in the reference-position coordinate memory PX again (S159). It is thereafter determined whether or not the dot pattern data of all the characters have been arranged in the print buffer 43 (S160). If it is determined in S160 that the dot pattern data of all the characters have not been arranged completely in the print buffer 43 (i.e., if the answer is negative in S160), the processes in S156 through S159 are repeatedly executed in succession so as to arrange the dot pattern data in the print buffer 43. On the other hand, if it is determined in S160 that the dot pattern data of all the characters have already been arranged in the print buffer 43 (i.e., if the answer is affirmative in S160), it is then determined whether or not "1" has been set to the cut mark flag CF (S48).

If it is determined in S161 that "1" has been set to the cut mark flag CF (i.e., if the answer is affirmative in S161), data about a cut mark is overwritten at a predetermined position in the print buffer 43 (S162), that is, a constant UE stored in the ROM 32 is added to the y-coordinates of the origin of the print buffer 43. Further, the width data H is subtracted from the result of addition to obtain a y-coordinate value of the origin. Then, printing dot data are written over a coordinate-value range from the value of the x-coordinates of the origin of the print buffer 43, which corresponds to the obtained y-coordinate value, to coordinate values based on the contents stored in the reference-position coordinate memory PX. Thereafter, the first print data producing process is completed, and the routine procedure proceeds to S140 for the printing process, where the contents in the print buffer 43 are printed (S140). When all the contents in the print buffer 43 are printed, the printing process is finished, and the routine procedure is returned to S1.

On the other hand, if it is determined in S161 that "1" has not been set to the cut mark flag CF (i.e., if the answer is negative in S161), it is then unnecessary to draw the cut mark. Therefore, the first print data producing process is immediately finished, and the routine procedure is shifted to S140, where the contents of the print buffer 43 are printed (S140). When all the contents of the print buffer 43 are printed, the printing process is completed, and the routine procedure is returned to S1.

If the character-string direction data M is set to either "1" or "3" in S137 for the printing process, that is, if the character-string direction is set at either 90° or 270° in the character-string direction setting mode (i.e., if the answer is affirmative in S137), a second print data producing process shown in FIG. 11 is executed (S139).

FIG. 11 is a flowchart of a second print data producing and processing program. When the second print data producing and processing program is initiated, the length (hereinafter referred to as a "text print length") of a text at the time when the text has been printed is calculated from the data of the character width stored in the character size memory SZ and the text in the text memory 41 (S171). It is then determined whether or not the text print length is longer than the width of the fitted tape, which has been stored in the RAM 34 (S172). If it is determined in S172 that the text print length is greater than the tape width (i.e., if the answer is affirmative in S172), the text cannot be printed on the tape. Therefore, the routine procedure is returned to S133 for the printing process, where an error display is made.

If it is determined in S172 that the text print length is less than the tape width (i.e., if the answer is negative in S172), it is then determined whether or not "1" has been set to the cut mark flag CF (S173). If it is determined in S173 that "1" has not been set to the cut mark flag CF (i.e., if the answer is negative in S173), the result obtained by adding the value of the character width stored in the character size memory SZ to the contents stored in the reference-position coordinate memory Px is stored in the reference-position coordinate memory PX (S176). Thereafter, the routine procedure proceeds to S178, which will be described later.

On the other hand, if it is determined in S173 that "1" has been set to the cut mark flag CF (i.e., if the answer is affirmative in S173), it is then determined whether or not the width data H stored in the width data memory is greater than the height of each character stored in the character size memory SZ (S174). If it is determined in S174 that the width data H is less than the character height (i.e., if the answer is affirmative in S174), a cut mark cannot be printed. Therefore, the routine procedure is returned to S153 for the printing process, where an error display is carried out.

Thereafter, the print control is finished, and the routine procedure is returned to S1. On the other hand, if it is determined in S174 that the width data H is not less than the character height (i.e., if the answer is negative in S174), the routine procedure proceeds to S175.

In S175, data about the character height stored in the character size memory SZ is first subtracted from the width data H. Then, the result obtained by adding a value about the character width stored in the character size memory SZ to a value obtained by dividing the result of subtraction by 2, is stored in the arrangement position memory dX (S175). Further, the result obtained by adding the contents stored in the arrangement position memory dX to the contents stored in the reference-position coordinate memory PX is stored in the reference-position coordinate memory PX (S177). The contents stored in the reference-position coordinate memory PX show a value representing the position on the print buffer 43 that the lower end of dot pattern data corresponds to when the dot pattern data such as characters is arranged or disposed in the center of a print region indicated by the width data H.

The dot pattern data such as the characters is arranged in the print buffer 43 with the contents stored in the reference-position coordinate memory PX and the reference-position coordinate memory PY as the reference positions. As a result, the upper end of the dot pattern data is centrally arranged between the print start position and the cut-mark position when "1" has been set to the cut mark flag CF, whereas the upper end thereof is centrally disposed in the print start position when "1" has not been set to the cut mark flag CF.

Next, outline data is read from the ROM 32 according to a character code. Further, the dot pattern data is developed on the image buffer 42 based on the read outline data (S178). Thereafter, a CG data rotating process for rotating the developed dot pattern based on the value of the character-string direction data M is executed (S179). If the character-string direction data M is "1" upon execution of this process, the character-string direction represents the transverse direction of the fitted tape. Therefore, the developed dot pattern is rotated at 90° counterclockwise. When, on the other hand, the character-string direction data M is "3", the character-string direction corresponds to the transverse direction of the fitted tape. Therefore, the developed dot pattern is rotated 270° counterclockwise. Thereafter, the data about the dot pattern subjected to the rotating process is placed in the reference position at which each of the contents stored in the reference-position coordinate memory PX and the reference-position coordinate memory PY is shown (S180).

Next, the value about the width of the character in the contents stored in the character size memory SZ is added to the contents stored in the reference-position coordinate memory PY, and the result of addition is stored in the reference-position coordinate memory PY again (S181). It is thereafter determined whether or not the dot pattern data about all the characters have been arranged in the print buffer 43 (S182). If it is determined in S182 that the dot pattern data about all the characters have not been arranged in the print buffer 43 (i.e., if the answer is negative in S182), the processes in S178 through S181 are repeatedly executed in succession so as to arrange the dot pattern data in the print buffer 43. On the other hand, if it is determined in S182 that the dot pattern data about all the characters have already been arranged in the print buffer 43 (i.e., if the answer is affirmative in S182), it is then determined whether or not "1" has been set to the cut mark flag CF (S183).

If it is determined in S183 that "1" has been set to the cut mark flag CF (i.e., if the answer is affirmative in S183), cut mark data is overwritten between each of positions of the x-coordinates corresponding to the width data H of the print buffer 43 and each of positions of the y-coordinates indicated by the contents stored in the tape upper-end and lower-end position memories YU and YS (S184), i.e., dot data for linear printing to be executed over the entire range of the tape width is written at the positions of the x-coordinates corresponding to the width data of the print buffer 43. Thus, dot data about a vertical rule mark extending from the upper end of the fitted tape to the lower end thereof is written at the positions of the x-coordinates.

Next, the second print data producing process is finished, and the routine procedure proceeds to S140, where the contents in the print buffer 43 are printed. When all the contents in the print buffer 43 are printed, the printing process is completed and the routine procedure is returned to S1.

On the other hand, if it is determined in S185 that "1" has not been set to the cut mark flag CF (i.e., if the answer is negative in S185), it is unnecessary to draw the cut mark. Therefore, the second print data producing process is completed, and the routine procedure is shifted to S140 for the printing process, where the contents in the print buffer 43 are printed. When all the contents in the print buffer 43 are printed, the printing process is finished and the routine procedure is returned to S1.

When it is desired to produce the tape T in the tape printer 1, an unprintable portion or area is formed between the cutter disposed on the left side of the tape cassette 13 and the thermal head 11. However, when the tape is fed by a distance between the thermal head 11 and the cutter in the course of the printing of the contents in the print buffer 43 and the feeding of the tape by the pressure roller 26 and the tape feed roller 27 in S140, the printing and the tape feeding are temporarily stopped, and the cutter is operated so as to cut the unprintable area. After completion of its cutting, the printing and the feeding of the tape are resumed, and all the contents in the print buffer 43 are printed.

The tape printer 1 is constructed in such a manner that after all the contents in the print buffer 43 have been printed, the tape is fed in succession by at least the distance between the thermal head 11 and the cutter, and the cutter is thereafter operated again so as to cut the tape T.

Figure 12:
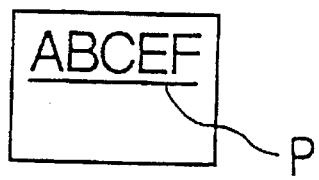
FIG. 12 is a view showing a sample in which characters for a text are printed on a tape together with a cut mark.

FIG. 12 is a view showing a sample in which characters for a text are printed on a tape together with a cut mark. In order to obtain the printed sample, the cut mark key 4 is depressed (i.e., the answer is affirmative in S6) after the text "ABCEF" has been inputted (S1 through S4). If it is determined that the "absence" of the cut mark has been displayed on the liquid crystal display 7 (S71 through S74), the cursor key C is depressed to display the "presence" of the cut mark on the liquid crystal display 7 (i.e., the answer is affirmative in S8 and the respective processes in S91 through S94 are executed). Thereafter, the return key R is depressed (i.e., the answer is affirmative in S10). If it is determined that the "presence" of the cut mark has been displayed on the liquid crystal display 7 (i.e., if the answer is negative in S71 and S73 and the routine procedure proceeds to S75), the return key R is immediately depressed (i.e., the answer is affirmative in S10).

Since the width data display mode is selected by depressing the return key R (S111 through S114), the cursor key C is operated so as to display a numeric value about a desired width on the liquid crystal display 7 (i.e., the answer is affirmative in S6, the answer is negative in S91, and the respective processes in S97 through S101 are executed). When the desired numeric value is displayed on the liquid crystal display 7, the return key R is depressed to set a position for printing the cut mark (i.e., the answer is affirmative in S10, the answer is negative in S111, and the respective processes in S115 through S117 are executed).

The character-string direction set key is next operated to display on the liquid crystal display 7 the character-string direction, which is being set at present (i.e., the answer is affirmative in S14 and the process in S15 is executed). Thereafter, the cursor key C is depressed to display a numeric value "0" on the liquid crystal display 7 (i.e., the answer is affirmative in S8, the answer is negative in S91 and S97, and the respective processes in S102 through S106 are executed). The return key R is then depressed to set the character-string direction to 0° (i.e., the answer is affirmative in S10, the answer is negative in S111 and S115, and the respective processes in S118 through S120 are executed).

When the print key 3 is then depressed (i.e., the answer is affirmative in S12), the printing process is executed (S13). Further, the first data producing process is executed (i.e., the respective processes in S131 through S136 are executed, the answer is negative in S137, and the process in S138 is executed). Thereafter, the text "ABCEF" is printed in the vicinity of the upper end of the tape along the longitudinal direction of the tape, and a cut mark P is printed at a position below the text along the longitudinal direction of the tape so as to be located at a position corresponding to the width set by the width data H extending from the upper end of the tape as described above (S140). The so-produced tape with the characters is cut by a pair of scissors or the like along the cut mark P to thereby produce a tape having a desired tape width.

Figure 13:
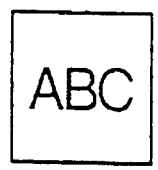
FIG. 13 is a view showing a printed sample free of a cut mark.

FIG. 13 is a view showing a printed sample free of a cut mark. After a text "ABC" has been input, the cut mark key 4 is depressed and the cursor key is suitably depressed to display the "absence" of the cut mark on the liquid crystal display 7. Thereafter, the return key R is depressed to set or display the absence of the cut mark on the liquid crystal display 7. When the character-string direction set key, the cursor key and the return key are thereafter operated to set the character-string direction at 0° and the print key 3 is depressed, the printing process is executed. As a result, only the text "ABC" is printed at the central position extending in the transverse direction of the tape.

After the text "ABCD" has been input (S1 through S4), the cut mark key 4 is depressed (i.e., the answer is affirmative in S6). If the "absence" of the cut mark is displayed on the liquid crystal display 7 (S71 through S74), the cursor key C is depressed to display the "presence" of the cut mark on the liquid crystal display 7 (i.e., the answer is affirmative in S8 and the respective processes in S91 through S94 are executed), after which, the return key R is depressed (i.e., the answer is affirmative in S10). If the "presence" of the cut mark is displayed on the liquid crystal display 7 (i.e., if the answer is negative in S71 and S73 and the process in S75 is executed), the return key R is immediately depressed (i.e., the answer is affirmative in S10).

Since the width data display mode is selected by depressing the return key R (S111 through S114), the cursor key C is operated so as to display a numeric value about a desired width on the liquid crystal display 7 (i.e., the answer is affirmative in S6, the answer is negative in S91, and the respective processes in S97 through S101 are executed). When the desired numeric value is displayed on the liquid crystal display 7, the return key R is depressed to set a position for printing the cut mark (i.e., the answer is affirmative in S10, the answer is negative in S111, and the respective processes in S115 through S117 are executed).

The character-string direction set key is next operated to display on the liquid crystal display 7 the character-string direction that is being set at present (i.e., the answer is affirmative in S14, and the process in S15 is executed). Thereafter, the cursor key C is depressed to display a numeric value "1" on the liquid crystal display 7 (i.e., the answer is affirmative in S8, the answer is negative in S91 and S97, and the respective processes in S102 through S106 are executed). The return key R is then depressed to set the character-string direction at 90° (i.e., the answer is affirmative in S10, the answer is negative in S111 and S115, and the respective processes in S118 through S120 are executed).

Figure 14:
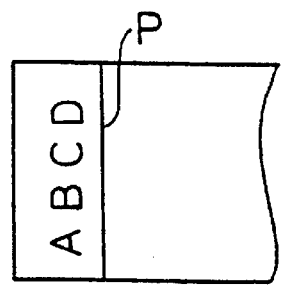
FIG. 14 is a view showing another printed sample in which characters for a text are printed on a tape together with a cut mark.

When the print key 3 is then depressed (i.e., the answer is affirmative in S12), the printing process is executed (S13). Further, the second data producing process is executed (i.e., the respective processes in S131 through S136 are executed, the answer is affirmative in S137, and the process in S139 is executed). Thereafter, a text "ABCD" is printed on a leading end portion of the tape along the transverse direction of the tape as shown in FIG. 14, and a cut mark P is printed at a position below the text along the longitudinal direction of the tape so as to be located at a position corresponding to the width set by the width data H extending from the leading end portion of the tape as described above (S140).

The so-produced tape with the characters applied thereon is cut by a pair of scissors or the like along the cut mark P in a manner similar to the tape shown in FIG. 12 to thereby produce a tape having a desired tape width.

Figure 15A:
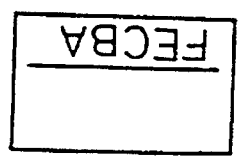
FIGS. 15A and 15B are views showing further printed samples in which characters for a text are printed on a tape together with a cut mark.
Figure 15B:
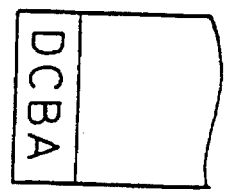

When the direction of the character string in the printed sample as shown in FIG. 12 is set at 180° by depressing the character-string direction set key 5, a printed sample as shown in FIG. 15(a) is obtained. When the direction of the character string in the printed sample as shown in FIG. 14 is set at 270° as an alternative to the above, a printed sample as shown in FIG. 15(b) is obtained.

In the tape printer 1 in the present embodiment as has been described in detail above, the cut mark key 4 or the like provided on the keyboard 6 makes a determination of whether or not the cut mark exists. When the cut mark exists, the position for printing the cut mark on the tape can be set on the liquid crystal display 7 based on the width data extending from the upper end of the tape. Further, the cut mark is printed on the tape based on the cut mark formed on the set print position together with the text stored in the text memory 41 to thereby create the tape with the characters printed thereon. Therefore, a tape with characters, which has a desired tape width, can be obtained depending on the purpose by cutting the produced tape along the cut mark.

Incidentally, the present invention is not necessarily limited to the above embodiment. It is needless to say that many changes and modifications may be made without departing from the spirit of the present invention.

The present embodiment has described, for example, a case where the reference position corresponding to the position for printing the cut mark on the tape exists on the upper end of the tape, the cut mark is located only in one place on the tape, and the characters are printed only between the upper end of the tape and the cut mark applied as a solid line. However, the reference position may be desired positions such as the lower end of the tape, the position on the center line of the tape, etc. Further, the cut mark may be applied at plural points extending in the transverse direction of the tape. Moreover, the cut mark may be a dot line, a dashed line or the like. Characters may be printed on respective regions partitioned by cut marks.

Further, the aforementioned embodiment has described only the case where the cut mark is printed along either one of the longitudinal direction of the tape and the transverse direction of the tape. However, if the cut mark is printed along both the longitudinal and transverse directions of the tape, a tape having desired sizes extending in the tape longitudinal and transverse directions can be produced.

Moreover, if a zoom function for printing characters in the maximum character size that enables the characters to be arranged up to the maximum width of a cut mark, is used in combination, characters having suitable sizes can be printed up to a maximum desired width of tape or split over two sections of tape which are separated by a cut mark.

What is claimed is:

1. A tape printer having text producing means for producing a text comprised of document data, a text memory for storing therein text data about a text produced by said text producing means and printing means for printing said document data in a printing direction on an elongated tape in accordance with the text data stored in said text memory, the tape printer comprising:

print mode setting means for setting a cut-mark print mode for printing a cut mark on the tape by said printing means; and print position specifying means for selectively specifying a cut mark print position and a cut mark orientation on the tape when said cut-mark print mode is set by said print mode setting means, wherein said cut mark orientation is one of approximately parallel and approximately perpendicular to said printing direction of said document data, and wherein said print mark position can be set freely relative to a position of said document data., said printing means for printing the cut mark at the position and in the orientation specified by said print position specifying means when the document data is printed on the tape in said cut-mark print mode, wherein said cut mark is extendible beyond the width of said document data if said cut mark orientation is parallel to said printing direction and said cut mark is extendible beyond the height of said document data if said cut mark orientation is perpendicular to said printing direction.

2. The tape printer according to claim 1, wherein said print position specifying means specifies the cut mark print position where a cut mark is printed within the width of the tape and the cut mark orientation is in the longitudinal direction of the tape.

3. The tape printer according to claim 2, wherein said print position specifying means specifies a print area on the tape between the cut mark print position and one of a tape upper edge and a tape lower edge.

4. The tape printer according to claim 1, wherein said print position specifying means specifies a cut mark print position and a cut mark orientation where a cut mark extending along the transverse direction of the tape is printed.

5. The tape printer according to claim 4, wherein said print position specifying means specifies a print area on the tape between the cut mark print position and a longitudinal edge of the tape, said longitudinal edge extending along the transverse direction of the tape.

6. The tape printer according to claim 4, wherein said print position specifying means specifies at least one other cut mark print position where a corresponding at least one other cut mark extending along the transverse direction of the tape is printed, and specifies a print area between the cut mark print position and the at least one other cut mark print position.

7. The tape printer according to claim 1, wherein said print position specifying means includes desired print position specifying means, said desired print position specifying means specifying a desired cut mark print position on the tape.

8. A tape printer having a control device for controlling a printing operation in accordance with a plurality of operating modes, the tape printer comprising:

mode selecting means for selecting an operating mode from said plurality of operating modes, wherein said mode selecting means includes means for selecting a text input mode, wherein when said text input mode is selected, said text data input via a text input means is stored in said text data memory, means for selecting a cut-mark key processing mode, wherein when said cut-mark processing mode is selected, a current cut mark printing status is displayed on a liquid crystal display, means for selecting a cursor key processing mode, wherein when said cursor key processing mode is selected, said current cut mark printing status is changed, means for selecting a width mode, wherein when said width mode is selected, width data corresponding to a printing position of the cut mark is displayed on said liquid crystal display and is changed between a maximum and a minimum value, and means for selecting a character-string direction mode, wherein when said character-string direction mode is selected, a character-string direction is displayed on said liquid crystal display and is changed between a maximum and a minimum value, said mode setting means for setting said width data corresponding to said printing position of said cut mark and for setting said character-string direction;

mode setting means for setting the selected one of said plurality of operating modes; and printing means for printing text data stored in a text data memory in accordance with said operating modes and for printing a cut mark in accordance with said operating wherein said printing means prints said text data stored in said text data memory in accordance with said character-string direction set by said mode setting means and prints said cut mark in accordance with said width data corresponding to said printing position of said cut mark set by said mode setting means.

9. The tape printer according to claim 8, wherein said character-string direction is one of 0°, 90°, 180° and 270°, the tape printer further comprising:

tape width indicating means for indicating a tape width of tape in the tape printer; and means for determining a tape upper end position and a tape lower end position of said tape, thereby defining a printable region of said tape in accordance with said tape width, wherein said printing means comprises:

means for carrying out a first printing operation when said character-string direction set by said mode setting means is one of 0° and 180°, and means for carrying out a second printing operation when said character-string direction set by said mode setting means is one of 90° and 270°.

10. The tape printer according to claim 9, further comprising a first reference position coordinate memory for storing an initial reference position coordinate in a transverse direction of said tape, and a second reference position coordinate memory for storing an initial reference position coordinate in a longitudinal direction of said tape, wherein said means for carrying out a first printing operation comprises:

means for determining a modified tape lower end position by subtracting said width data from said tape upper end position;

means for determining a transverse reference position coordinate deviation (dY) in accordance with the following relation:

$$dY=YS+(YU-YS-SZ)/2$$

where YS represents said modified tape lower-end position, YU represents said tape upper-end position, and SZ represents a height of said text data;

means for determining a final transverse reference position coordinate by adding said transverse reference position deviation (dY) to said initial transverse reference position coordinate; and means for determining a final longitudinal reference position coordinate by adding said height of said text data to said initial longitudinal reference position, wherein said printing means prints said text data and said cut mark in accordance with said final transverse reference position coordinate and said final longitudinal reference position coordinate.

11. The tape printer according to claim 10, wherein said printing means prints said cut mark between a point defined by said initial longitudinal reference position and said initial transverse reference position plus a predetermined constant minus said width data and a point defined by said final longitudinal reference position and said initial transverse reference position plus said predetermined constant minus said width data.

12. The tape printer according to claim 9, further comprising a first reference position coordinate memory for storing an initial reference position coordinate in a transverse direction of said tape, and a second reference position coordinate memory for storing an initial reference position coordinate in a longitudinal direction of said tape, wherein said means for carrying out a second printing operation comprises:

means for determining a longitudinal reference position coordinate deviation (dX) in accordance with the following relation:

$$dX=(H-SZ)/2+SZ$$

where H represents said width data and SZ represents a height of said text data;

means for determining a final longitudinal reference position coordinate by adding said longitudinal reference position coordinate deviation (dX) to said initial longitudinal reference position coordinate; and means for determining a final transverse reference position coordinate by adding said height of said text data to said initial transverse reference position, wherein said printing means prints said text data and said cut mark in accordance with said final transverse reference position coordinate and said final longitudinal reference position coordinate.

13. The tape printer according to claim 12, wherein said printing means prints said cut mark between a point defined by said width data and said tape lower-end position and a point defined by said width data and said tape upper-end position.

14. A method of controlling a printing operation of a tape printer for printing text data in a printing direction and a cut mark in accordance with a plurality of operating modes, the method comprising the steps of:

selecting an operating mode from said plurality of operating modes;

setting the selected one of said plurality of operating modes;

specifying a cut mark print position in accordance with the selected one of said plurality of said operating modes, wherein said print mark position can be set freely relative to a position of said document data;

specifying a cut mark orientation in accordance with the selected one of said plurality of said operating modes;

orienting said cut mark in accordance with said cut mark orientation, said cut mark. Orientation being one of approximately parallel and approximately perpendicular to said printing direction of said document data; and printing said text data stored in a text data memory and a cut mark in accordance with the selected one of said operating modes, wherein said cut mark extends beyond a width of said document data when said cut mark orientation is approximately parallel to said printing direction and said cut mark extends beyond a height of said document data when said cut mark orientation is approximately perpendicular to said printing direction.

15. The method according to claim 14, wherein said mode selecting step comprises the steps of:

storing text data input via a text input means in said text data memory;

selecting a cut-mark key processing mode, wherein when said cut-mark processing mode is selected, a current cut mark printing status is displayed on a liquid crystal display;

selecting a cursor key processing mode, wherein when said cursor key processing mode is selected, said current cut mark printing status is changed;

selecting a width mode, wherein when said width mode is selected, width data corresponding to a printing position of the cut mark is displayed on said liquid crystal display and is changed between a maximum and a minimum value; and selecting a character-string direction mode, wherein when said character-string direction mode is selected, a character-string direction is displayed on said liquid crystal display and is changed between a maximum and a minimum value, said setting step setting said width data corresponding to said printing position of said cut mark and setting said character-string direction, wherein in said printing step, said text data stored in said text data memory is printed in accordance with said character-string direction set in said setting step and said cut mark is printed in accordance with said width data corresponding to said printing position of said cut mark set in said setting step.

16. The method according to claim 15, wherein said character-string direction is one of 0°, 90°, 180° and 270°, the method further comprising the steps of:

reading a tape width of tape in the tape printer; and determining a tape upper end position (YU) and a tape lower end position (YS) of said tape, thereby defining a printable region of said tape in accordance with said tape width, wherein said printing step comprises the steps of:

carrying out a first printing operation when said character-string direction set in said setting step is one of 0° and 180°, and carrying out a second printing operation when said character-string direction set in said setting step is one of 90° and 270°.

17. The method according to claim 16, further comprising the steps of storing an initial reference position coordinate in a transverse direction of said tape in a first reference position coordinate memory, and storing an initial reference position coordinate in a longitudinal direction of said tape in a second reference position coordinate memory, wherein said step of carrying out a first printing operation comprises the steps of:

subtracting said width data from said tape upper end position to determine a modified tape lower end position;

determining a transverse reference position coordinate deviation (dY) in accordance with the following relation:

$$dY=YS+(YU-YS-SZ)/2$$

where YS represents said modified tape lower-end position, YU represents said tape upper-end position, and SZ represents a height of said text data;

adding said transverse reference position coordinate deviation (dY) to said initial transverse reference position coordinate to determine a final transverse reference position coordinate; and adding said height of said text data to said initial longitudinal reference position to determine a final longitudinal reference position coordinate, wherein in said printing step, said text data and said cut mark are printed in accordance with said final transverse reference position coordinate and said final longitudinal reference position coordinate.

18. The method according to claim 17, wherein in said printing step, said cut mark is printed between a point defined by said initial longitudinal reference position and said initial transverse reference position plus a predetermined constant minus said width data and a point defined by said final longitudinal reference position and said initial transverse reference position plus said predetermined constant minus said width data.

19. The method according to claim 16, further comprising the steps of storing an initial reference position coordinate in a transverse direction of said tape in a first reference position coordinate memory, and storing an initial reference position coordinate in a longitudinal direction of said tape in a second reference position coordinate memory, wherein said step of carrying out a second printing operation comprises the steps of:

determining a longitudinal reference position coordinate deviation (dX) in accordance with the following relation:

$$dX=(H-SZ)/2+SZ$$

where H represents said width data and SZ represents a height of said text data;

adding said longitudinal reference position coordinate deviation (dx) to said initial longitudinal reference position coordinate to determine a final longitudinal reference position coordinate; and adding said height of said text data to said initial transverse reference position to determine a final transverse reference position coordinate, wherein in said printing step, said text data and said cut mark are printed in accordance with said final transverse reference position coordinate and said final longitudinal reference position coordinate.

20. The method according to claim 19, wherein in said printing step, said cut mark is printed between a point defined by said width data and said tape lower-end position and a point defined by said width data and said tape upper-end position.

* * * * *